Patented Sept. 21, 1954

2,689,804

UNITED STATES PATENT OFFICE 2,689,804

PROCESS OF PRODUCING A LIGHT DIFFUSING FILM ON A GLASS SURFACE

Meier Sadowsky, Elkins Park, Pa., assignor to Philco Corporation, Philadelphia, Pa., a corporation of Pennsylvania No Drawing. Application February 7, 1952, Serial No. 270,507

9 Claims. (Cl. 117—64)

The present invention has to do with the problem of eliminating objectionable specular reflection from glass surfaces. Particularly, the invention relates to a method or process of treating the exposed or outer face of a direct view cathode ray tube of the general type used in television receivers, so as to provide such face with a uniform diffusing surface which reduces specular reflection to a point where it is no longer annoying to the viewer.

Suggestions heretofore made to solve the above mentioned specular reflection problem have included processes of frosting the face of the cathode ray tube for the purpose of providing the tube with a face which exhibits low reflectivity. These heretofore suggested frosting processes have had to do with either acid etching or sand blasting the face of the cathode ray tube. A more recently suggested procedure has been to spray the face of the cathode ray tube with a silicate solution and then to subject the tube to a baking treatment so as to obtain a frosted finish on the face of the tube. Although most of these various known processes have had favorable results, they necessitate special and intricate equipment, demand technical and critical care and require skilled and tedious operations. Moreover, those processes which involve acid etching, sand blasting or spraying and baking a silicate solution onto the face of a cathode ray tube are apt to affect the surface structure of the glass so that salvage of a defective tube requires careful and expensive buffing procedures. Also, known methods involving acid etching, sandblasting or spraying and baking steps, are time consuming and for that reason are bound to retard production.

It is an important object of this invention to obtain an effectual light diffusing frost-like surface on glass by means of a process or method which can be carried out without the use of expensive equipment or machinery, and which can be performed without the exercise of extraordinary skill or technical ability.

Other and more specific objects of this invention have to do with the provision of a process or method specially suited for the treatment of the glass face of a cathode ray tube to produce a coating which effectually prevents annoying specular reflection of light from said face. The process is such that it produces a frost-like coating within an exceedingly short period of time so as not seriously to hamper established rapid production-line procedures, which coating can be easily removed from the face of the tube without buffing and without danger of injuring said face.

In achievement of the above mentioned objectives, the process according to the present invention involves simple successive steps which can be readily performed with inexpensive material by simple manipular operations of short duration. In preparing the glass surface for treatment in accordance with the process of the invention, it is not necessary that the glass surface be exceptionally clean, but it is desirable that said surface be cleansed of adherent dust and dirt. This may be done by merely wiping the glass surface.

In accordance with the invention, in order to produce a "frost" effect on the clear glass surface, said surface is thoroughly wetted with an excess of silicate solution, for example, potassium or sodium silicate in concentrated or diluted form. A readily available concentrated solution suitable to carry out the process, is made up of about 28 parts, by weight, of potassium silicate ($1K_2O:3.9SiO_2$ molar ratio) and about 72 parts, by weight, of water.

It is to be understood that the invention is not limited to the use of the above specified solution because, it will be recognized, the relative proportions of the silicate and the water can be varied without affecting the ultimate result of the process. However, it is preferable to employ a silicate solution which is not too highly diluted because, in that event, the frost-like film produced by the process, as will be hereinafter described, may not have sufficient depth to obtain the best result. Good satisfactory results are obtained with silicate solutions in which the silicate content varies within a range from approximately 28% down to approximately 10%, and it has been found that a 1 to 1 dilution, with water of a concentrated 28% silicate solution to obtain a solution with a silicate content of approximately 14%, is well suited for the purpose of the invention. Moreover, it is to be understood that the invention is not limited to the use of potassium silicate specified in the above given example since, in practice, any of the known water soluble silicates will serve the purpose of the process. The glass surface may be wetted with the silicate solution in any suitable manner, as by spraying, brushing or wiping on, flowing, dipping, etc.

When the solution has been applied, the excess is lightly wiped off with a soft absorptive material, for example, cheese cloth or absorbent cotton. This wiping off is done with light pressure and with repeated full strokes across the entire glass surface. In this manner, the solution is caused to spread in an even coat over every part of the glass surface.

Following the wiping off step, the surface is lightly "rubbed" with a hard non-absorptive material, for example, steel wool or spun metal. The "rubbing" operation is best accomplished by gliding the non-absorptive material across the coated surface, the rubbing being done with light pressure and with rapid back and forth sweeping motions until said surface exhibits a smooth frost-like appearance which becomes visible within a short period of time after the start of the rubbing operation. In practice, it has been found that the process, from the first step of applying the silicate solution to the glass surface, through the second step of lightly wiping off the excess solution, and through the third and final step of lightly rubbing the coated surface until the desired frost-like surface appears, can be satisfactorily performed within one minute's time.

Without wishing to limit myself to any specific theory, it is believed that the rubbing, with light rapid motion and with non-absorptive material, of the glass surface which is thoroughly wetted with the silicate solution, is what causes a uniform frost-like light-diffusing film to appear on said glass surface. The reason for this belief is two-fold. Firstly, the light and rapid rubbing motion with the hard non-absorptive material, continually renews the surface of the film as it forms, so that the evaporation rate of the water in the solution is effectively increased. This renewal of the film surface and consequent increase in the rate of water evaporation result in preventing the formation of a water impervious layer which would trap water and interfere with the appearance of a uniform surface film. Secondly, the agitation brought about by the light rapid rubbing motion creates a condition in which carbon dioxide from the air is introduced in the solution, and this introduction of $CO_2$ following a slight rise in temperature which results from friction due to the rubbing action, enhances gelation or precipitation of the silicate. These reasons lead to the conclusion that the formation of the frost-like diffusing film is due mainly to a reaction within the silicate solution rather than to a reaction with the hard surface of the glass.

The frost-like coating or light diffusing film produced by the above described process, overlies and adheres to the glass surface without penetrating said surface. For that reason, said coating or film produced in accordance with the invention, can be removed from the glass surface whenever desired, and the removal of said coating or film leaves the glass surface intact and in its original clear appearance. Ready removal of the frost-like coating is conveniently obtained by vigorously rubbing the surface with steel wool or the like, or with a cloth saturated with a mild acid, for example, ammonium bifluoride solution or hydrofluoric acid.

An important and significant advantage of the "frost" producing process carried out as above described, is that it produces, within a matter of seconds, a satisfactory light-diffusing frost-like coating which is hard and abrasion resistant and which, when normally handled, will show no smudges, finger prints and the like. Another noteworthy and advantageous feature of the invention is that, in the event the process results in producing a frost-like coating which is not deep enough to accomplish the wanted purpose, an additional coating can be superimposed upon the previous coating by simply repeating the steps of the process, or the previous coating can be readily removed and the process started anew to produce a coating of desired depth. Moreover, because the process provides the glass surface with a coating which can be easily rubbed off with steel wool or washed off with a mild acid as hereinbefore indicated, the treated surface can quickly be restored to its original condition.

I claim:

1. The process of producing a light diffusing film on a glass surface, comprising the steps of coating the glass surface with an aqueous solution of a water soluble silicate selected from the group consisting of potassium silicate and sodium silicate to form a film on said glass surface, said solution containing the silicate in such concentration that the solution has a silicate content within a range from approximately 28% down to about 10% by weight, and agitating the solution on the glass surface by rubbing with non-absorptive material until the film on said glass surface assumes a frost-like appearance.

2. The process of producing a light diffusing film on a glass surface, which consists in wetting the glass surface with an excess of an aqueous solution of a water soluble silicate selected from the group consisting of potassium silicate and sodium silicate and of such concentration that the solution has a silicate content within a range from approximately 28% down to about 10% by weight, wiping the excess solution with absorptive material to provide a film over the glass surface, and agitating the solution on the glass surface by rubbing with non-absorptive material until the film on said glass surface assumes a frost-like appearance.

3. The process as set forth in claim 2, in which the solution consists of an aqueous solution of a water soluble silicate selected from the group consisting of potassium silicate and sodium silicate and with a concentration of about 14% silicate, by weight.

4. The process of treating the glass face of a cathode ray tube to prevent specular reflection from said face, which process includes the steps of applying on said glass face a substantially uniform coating of an aqueous solution of a water soluble silicate selected from the group consisting of potassium silicate and sodium silicate to form a film on said face, said solution containing the silicate in such concentration that the solution has a silicate content within a range from approximately 28% down to about 10% by weight, and agitating the solution on the said glass face by rubbing with non-absorptive material until the film on said face assumes a frost-like appearance.

5. The process of treating the glass face of a cathode ray tube to prevent specular reflection from said face, which process consists in first wetting said glass face with an excess of an aqueous solution of a water soluble silicate selected from the group consisting of potassium silicate and sodium silicate and of such concentration that the solution has a silicate content of about 14% by weight, then wiping the excess with absorptive material to spread said solution in a substantially uniform film over said glass face, and thereafter agitating the solution on said glass face by rubbing with non-absorptive material until the film on said glass face assumes a frost-like appearance.

6. The process, as set forth in claim 1, in which the solution consists of an aqueous solution of a water soluble potassium silicate.

7. The process as set forth in claim 1, in which the solution consists of an aqueous solution of a water soluble sodium silicate.

8. The process, as set forth in claim 5, in which the solution consists of an aqueous solution of a water soluble potassium silicate ($1K_2O:3.9SiO_2$ molar ratio).

9. The process, as set forth in claim 5, in which the solution consists of an aqueous solution of a water soluble sodium silicate.

References Cited in the file of this patent

UNITED STATES PATENTS

| Number | Name | Date |
|---|---|---|
| 2,356,553 | Weissenberg | Aug. 22, 1944 |
| 2,417,147 | Wood | Mar. 11, 1947 |
| 2,428,357 | Cohen | Oct. 7, 1947 |